United States Patent [19]

Gamache

[11] Patent Number: 5,191,803
[45] Date of Patent: Mar. 9, 1993

[54] DETECTION OF AN ANTICORROSION OIL APPLIED INTO A SHIP'S BALLAST

[75] Inventor: Roger A. Gamache, Ile des Soeurs, Canada

[73] Assignee: Mag Chem Inc., Boucherville, Canada

[21] Appl. No.: 644,919

[22] Filed: Jan. 22, 1991

[51] Int. Cl.⁵ ................... G01M 19/00; G01N 21/33
[52] U.S. Cl. .................................. 73/865.8; 252/387; 73/104
[58] Field of Search ............... 73/865.8, 104; 252/387, 252/301.16

[56] References Cited

U.S. PATENT DOCUMENTS

| | | | |
|---|---|---|---|
| 2,806,959 | 9/1957 | DeForest et al. | 73/104 |
| 3,162,642 | 12/1964 | McCafferty | 252/301.16 |
| 3,856,465 | 12/1974 | Lipscomb | 73/104 |
| 4,495,225 | 1/1985 | Ciuba et al. | 252/395 |
| 4,781,757 | 11/1988 | Lamb | 106/11 |
| 4,982,601 | 1/1991 | Troxell | 73/104 |

Primary Examiner—Hezron E. Williams
Assistant Examiner—George M. Dombroske
Attorney, Agent, or Firm—Foley & Lardner

[57] ABSTRACT

A method for detecting the presence of any discontinuity in an anticorrosion oil coating applied onto the internal walls of a nautical ballast. The method comprises the steps of (1) adding an oil-soluble tracer to the anticorrosion oil coating prior to its application onto the internal walls of the ballast, the tracer being insoluble in water and rust; inert to rust, water and the oil; and capable of emitting visible light under the effect of a black light; (2) after application of the oil coating, submitting the inside walls coated with the oil to the effect of a black light, and (3) checking the continuity of the visible light that is emitted by the oil coating, whereby the presence of oil is detected by visible light emitted by the tracer and its absence is detected by the absence of any emitted visible light. An anticorrosion oil containing such a tracer is also disclosed.

5 Claims, No Drawings

DETECTION OF AN ANTICORROSION OIL APPLIED INTO A SHIP'S BALLAST

BACKGROUND OF THE INVENTION

1. Field of the invention

The invention is directed to a method for rapidly and easily detecting the presence of any discontinuity in an anticorrosion oil coating applied onto the internal surfaces of a nautical ballast. The invention is also directed to an anticorrosion oil for use as such a coating, which oil contains tracer allowing its detection.

2. Description of related art

Water ballasts are commonly used to improve the stability and to control the draft of a ship. These are generally huge metallic reservoirs in which ambiant water is pumped in, as the ship is unloaded. A stable center of gravity within the ship is thus maintained. The ballasts are generally divided into fore peak tank, after peak tank and wing tanks water ballasts.

These ballasts have a high tendency to corrode and for this reason, they are oil coated to substantially slow down corrosion. The oil is either applied by spraying with a spray gun, or by a floating operation wherein oil is poured into a ballast filled up with water. In this operation, the supernatant oil over the water is layed over the inside walls of the ballast as the water is removed from the bottom of the ballast.

In view of the high tendency of the ballasts to corrode, it is very important to ensure that the oil entirely covers their internal walls. For this purpose, persons have to enter into the ballasts to inspect the continuity of the oil coating. However, such an inspection is subjective and so far has not been satisfactory.

SUMMARY OF THE INVENTION

Applicant has now developed a new product and a new method to detect the presence of any discontinuity in an anticorrosion oil coating applied onto the internal walls of a nautical ballast.

By "nautical ballasts" there is meant any ballast used in ships such as oil tankers, cargo-vessels, bulk carriers, container vessels, lighter board ships (LASIT) and the like, and in particular, lakers.

Broadly stated, the invention is directed to a method for detecting the presence of any discontinuity in an anticorrosion oil coating applied onto the interior surface of a nautical ballast, comprising:

adding an oil-soluble tracer to the anticorrosion oil prior to its application as coating onto the internal walls of the nautical ballast, said oil-soluble tracer being substantially insoluble in water and rust, substantially inert to said anticorrosion oil, rust and water and capable of emitting visible light under the effect of a black light, after application of said oil coating, submitting the internal walls of said ballast coated with said anticorrosion oil to the effect of a black light, and checking the continuity of the visible light emitted by said coating, whereby presence of said oil coating is detected by visible light emitted by said tracer, and absence of said oil coating is detected by the absence of any emitted visible light.

The invention is also directed to an anticorrosion oil containing an oil soluble tracer substantially insoluble to water and rust, said tracer being inert to said oil, rust and water and capable of emitting visible light under the effect of a black light.

GENERAL DESCRIPTION OF THE INVENTION

The anticorrosion oil to be used in accordance with the invention can be of any type presently being used to protect ballasts against corrosion. By way of example, use can be made of the oil sold by the Applicant under the trademark "MAGNAFILM M", which oil is a rust-retarding ballast tank coating made up of organic components having a viscosity of 100 cpt at 23.5° C. and a strong ability to form complex with inorganic surfaces, in order to provide long term protection, forming a uniform thin film, tight coating. This oil which can be applied to existing coatings to stop rusting, is polar and thus seeks out base metal and attaches itself to it. Bare areas can also be touched up. Of course, other anticorrosion oil of the same type presently available in the market could also be used.

In accordance with the invention, a tracer that is responsive to black light is added to this anticorrosion oil.

To be effective, the tracer must be highly soluble in the anticorrosion oil. It must however be substantially insoluble in water and rust, and be inert to oil, water and rust, keeping in mind that ballasts are generally covered with rust.

The tracer must also be such that only traces thereof are required to produce a detectable visible light. The tracer must not chemically affect the ballast, nor chemically or mechanically affect the pumping equipment. It must have such an affinity for oil as to leave no precipitate, and it must not stay on the inside walls if the ballast of the anticorrosion oil is worn out.

Contrary to natural coloring substances that could be added to the anticorrosion oil and would either dissolve in water and color the rust or metal, or be scarcely distinguishable from said rust, the tracer used in accordance with the invention is so selected as to be soluble in the corrosion oil only and be responsive to black light, thereby making its detection much reliable.

Similarly, contrary to solid light reflecting particles that could be added to the anticorrosion oil and would generate problems such as settling and sedimentation after long storage, and be abrasive to pumps and application systems, the tracer used in accordance with the invention is so selected as to be highly soluble in the anticorrosion oil.

Of course, the tracer used in accordance with the invention must also be so selected as to not have any corrosion inhibiting effects on the corrosion inhibitors contained in the anticorrosion oil. As tracer, use can be made of any fluorescent substance presently available, that meets all the above requirements. As an example of such a substance, use can be made of the fluorescent yellow oil additive sold by PYLAM PRODUCTS COMPANY INC. under the trademark PYLAKROME oil fluor yellow LX-8248 for use in the aeronautic industry to detect failure on mechanical parts.

From 0.3% to 1%, and preferably 0.5% by weight of PYLAKROME oil fluor yellow LX-8248 tracer may be conveniently added to the anticorrosion oil. This addition can easily be completed by mixing the tracer with the anticorrosion oil.

The resulting mixture of anticorrosion oil and tracer can be applied by spray, as is known per se, and is preferably applied in this manner. Alternatively, it may also be applied by the floating method mentioned hereinabove when there are no alternatives. It is applied over a uniform rust coating.

For spray application, a single coat, double pass may provide about 3 mil coat, and cover 23.5 sq. meters (250 sq. ft.) per 4.5 liters on rusty surfaces and/or 46.5 sq. meters (500 sq. ft.) on dewsted surfaces.

For floating application, one has to calculate the area to be coated and determine the amount required for the spray application, bearing in mind that 10 mm (⅜ in) of product should float on the water. The water surface area is calculated and then the amount of product required to cover the surface with 10 mm is is determined, allowing 75 l (20 gal.) per 9 sq. meters (100 sq. ft.) to float 10 mm of product. In extreme cases, such as double bottom tanks, internal structures, twice to five times the calculated quantity may be required.

The overheads of tanks are always sprayed.

The floating application method may comprise the following steps:

Loose scale is removed by high pressure hose, machine washing, or other means. In order to remove rust, silt and other sediment, the tank can be mucked and hosed, thereby making more product available for protection of tank surfaces.

The calculated required amount of oil is poured in the bottom of the empty tank. Then, the tank is slowly filled, no more than 2 inches per minute. If turbulence occurs, the filling rate should be reduced until turbulence stops and product layer reforms. If the tank construction has lightening holes, care should be taken to allow the product to spread evenly, holding the water level at a depth in the tank to allow this distribution.

The tank is then pressed to coat overheads. The areas that are difficult to coat because of air pockets should be sprayed to provide protection.

Thereafter, the tank is slowly de-ballasted and the discharge is stopped at lightening hole levels to allow film to reform.

This procedure of filling and de-ballasting can be repeated as above one or more times. Preferably, 48 hours with normal ventilation should be allowed before putting tank into service.

After application, inspection of the coating can be made at any time by entering into the ballast and projecting a black light (i.e. UV light) onto the internal walls of this ballast.

Any discrepancy, discontinuity or "hole" in the coating will be immediately noticed by a reduction in intensity or complete lack of the visible light emitted back by the oil coating.

In the previous specification, the addition of a fluorescent oil-soluble tracer to an anticorrosion oil coating has exclusively been disclosed as being useful for application onto the walls of marine ballast tanks. It is worth mentioning however that such an addition is also useful for the same purpose in other preventive applications, where a corrosion preventive coating applied onto a wall or piece is to be checked, such as:

a) the internal corrosive protection of commercial aircraft "bellies", and other recessed closed-in areas;

b) the corrosive protection of high precision machinery prior to shipment overseas;

c) the corrosive protection of "in-process" disassembled parts, during machining, metallizing, and inspection operations, prior to reassembly.

Accordingly, the invention as claimed hereinafter must not be interpreted as being exclusively restricted to application to nautical ballasts, although reference to such a specific application appears in some of the claims.

I claim:

1. A method for detecting the presence of a discontinuity in an anticorrosion oil coating applied onto the interior walls of a metallic nautical ballast, comprising:
   providing an anticorrosion oil for preventing corrosion in a metallic nautical ballast,
   adding an oil-soluble tracer to said anticorrosion oil prior to the application as a coating on the internal walls of said nautical ballast, said tracer being substantially insoluble in water and rust, said tracer being also substantially inert to said oil, rust and water and primarily useful for emitting visible light under the effect of a black light,
   applying said anticorrosion oil to the internal walls of said nautical ballast to form a coating,
   after application of said coating, submitting the internal walls of said ballast coated with said anticorrosion oil to the effect of a black light, and
   checking the continuity of the visible light being emitted by the oil coating, whereby presence of said oil coating is detected by visible light emitted by said tracer and absence of said oil coating is detected by the absence of any visible light emitted back.

2. The method as defined in claim 1, wherein said oil soluble tracer is fluorescent oil additive.

3. The method as defined in claim 2, wherein said additive is present in said anticorrosion oil in an amount of 0.3% to 1% by weight.

4. The method as defined in claim 1, wherein said internal walls are submitted to the effect of black light after the ballast has been used and thus fill up at least once with water, to check the erosion of said oil.

5. The method as defined in claim 1, wherein said inside walls are submitted to the effect of black light immediately after application of said coating.

* * * * *